United States Patent
MacZura et al.

[15] 3,655,339
[45] Apr. 11, 1972

[54] PRODUCTION OF LOW-SODA ALUMINA

[72] Inventors: George MacZura, East St. Louis, Ill.; Alan Pearson, St. Louis, Mo.

[73] Assignee: Aluminum Company of America, Pittsburgh, Pa.

[22] Filed: July 18, 1969

[21] Appl. No.: 843,181

[52] U.S. Cl..................................................23/142, 23/143
[51] Int. Cl. ...............................................................C01f 7/02
[58] Field of Search...........................23/142, 143, 102 R

[56] References Cited

UNITED STATES PATENTS

| | | |
|---|---|---|
| 2,454,227 | 11/1948 | Smith et al..............................23/143 |
| 2,769,688 | 11/1956 | Milliken, Jr. et al....................23/143 |
| 3,436,176 | 4/1969 | Spedden et al. .........................23/143 |
| 2,405,275 | 8/1946 | Stowe |
| 2,961,297 | 11/1960 | Fenerty |
| 3,092,452 | 6/1963 | Gitzen |
| 3,092,453 | 6/1963 | Gitzen |
| 3,106,452 | 10/1963 | Watson et al. |

*Primary Examiner*—Oscar R. Vertiz
*Assistant Examiner*—Hoke S. Miller
*Attorney*—Abram W. Hatcher

[57] ABSTRACT

Production of a low-soda alumina by calcining an alumina starting material of low-soda content at 1,100°–1,400° C followed by leaching. The starting alumina material contains less than 0.25 percent by weight soda, and the final alumina contains less than 0.1 percent by weight soda. The calcining is continued until the product is at least 75 percent by weight alpha alumina. Reduction in amount of soda from the alumina starting material to the final alumina product is at least 75 percent.

5 Claims, No Drawings

PRODUCTION OF LOW-SODA ALUMINA

BACKGROUND OF THE INVENTION

This invention relates to production of low-soda alumina. More particularly, it relates to an improved process for producing low-soda alpha-alumina from an alumina starting material of low-soda content.

Alumina for production of high-grade ceramic bodies such as spark plug insulators or the like is required to have a very low content of soda. U. S. Pat. No. 1,950,883 teaches production of such a low-soda alumina by calcination of alumina hydrate at 400° to 925° C followed by leaching with a dilute acid solution. However, according to this process the calcining produces an amorphous alumina or a mixture of amorphous and crystalline alumina which must be recalcined after leaching before producing an alumina satisfactory for refractory or ceramic material use. Furthermore, the leaching must be done with an acid solution. U. S. Pat. No. 2,961,297 also teaches preparation of a low-soda alumina. However, according to this patent a contaminating mineralizer such as aluminum fluoride must be used during the calcination step. Both U. S. Pat. Nos. 1,950,883 and 2,961,297 teach starting with an alumina hydrate which has a soda content of greater than about 0.2 percent by weight (measured as $Na_2O$ on the basis of $Al_2O_3$). Therefore, development of a method for production of a low-soda ceramic-grade alpha-alumina which does not require the presence of a contaminating mineralizer during calcining and which produces a crystalline form of alpha-alumina readily washable and dryable without recalcination to a form appropriate for ceramic use represents a highly desirable result.

SUMMARY OF THE INVENTION

It is accordingly one object of this invention to provide an improved process for the production of a low-soda alumina. Another object is to provide a process for production of low-soda alumina which requires only two basic steps. Further objects will be apparent from the description and claims which follow.

In its broader aspects our invention involves calcining an alumina starting material of a soda content of less than about 0.25 percent by weight (based on the $Al_2O_3$) at about 1,100° to 1,400° C in the absence of a mineralizer until the starting material is converted to at least 75 percent by weight alpha-alumina of a water content of about 0.3 to 1.5 percent by weight and then leaching the alpha-alumina until it contains less than about 0.1 percent by weight soda ($Na_2O$) (measured as $Na_2O$ on the basis of $Al_2O_3$). By water content in percent by weight we mean the total water, that is, the total amount of water in percent by weight of $Al_2O_3$ contained by the alumina starting material after the calcining, including both any chemically combined water and water adsorbed upon exposure to 44 percent relative humidity. It may take several hours, for example, from about 2 to about 5 hours to reach the necessary 1,100° to 1,400° C calcining temperature. However, the actual calcination at this temperature generally requires only a few minutes, for example, for about 5–45 minutes. The leaching may be performed by using either water or a dilute acid or dilute alkali. The pH of the washing solution is preferably from about 4 to about 9, the most effective pH being 6–8. It is preferred that the water be hot. The preferred calcination temperature is from about 1,200° C to about 1,300° C.

It is immaterial how the alumina starting material of a soda content of less than about 0.25 percent by weight is prepared. It may be either alumina hydrate or an alumina which is not alpha-alumina, hereinafter referred to as nonalpha-alumina. One way in which the desired low-soda alumina starting material may be prepared is by the well-known Bayer process in which bauxite or other appropriate alumina source material is leached and digested with an alkaline or caustic solution and the alumina hydrate precipitated from the resulting sodium aluminate solution by controlled seeding or carbonation. An alternate method of preparing the required low-soda alumina starting material is by activating (for example, by the well-known procedure of heating at less than a calcination temperature, for example, less than about 400° C to remove the water of hydration) an alumina trihydrate of a higher soda content than that required for the alumina starting material to a point at which it is converted to a non-alpha-alumina which has a high amount of soluble soda and then washing the product to remove soluble soda, thereby forming an alumina starting material of the required low-soda content of less than about 0.25 percent.

DESCRIPTION OF THE PREFERRED EMBODIMENTS

The following examples presented in table form are illustrative of the invention.

The following chart presents the results of calcining and leaching various Bayer alumina hydrate samples. Samples containing both below and above the less than about 0.25 percent $Na_2O$ level required according to the process of this invention were treated to demonstrate the criticality of the low-soda content of the alumina starting material. The samples used had soda ($Na_2O$) contents ranging from 0.08 to 0.62 percent. The samples were dry screened to a 100 to 325 mesh size fraction to minimize the effect of particle size as a variable. The 100-325 mesh hydrate was water leached before use to remove any excess soluble soda by heating 500 g. hydrate in 2 liters of distilled water for 30 minutes at 77° to 88° C with stirring, the resulting slurry being filtered on a Buchner funnel, washed with a liter of hot water and dried at 110° C.

Eight 50 g. alumina starting material samples were heated in alumina crucibles in a single firing for 10 minutes at 1,250°-1,260° C to obtain an alpha-alumina containing about 0.5 percent water. Time to temperature was 2½ hours. The crucibles were positioned close together in a single horizontal plane within the staggered chamber of the furnace to minimize tem- EFFECT OF BAYER HYDRATE SODA LEVEL ON WATER LEACHABLE $Na^2O$ IN ALPHA ALUMINA

| Washed hydrate 100-325 mesh [1] | | | Calcined alumina [2] | | | | | | Hot-water leaching [4] $Na_2O$ reduction-percent, orig. $Na_2O$ basis | |
|---|---|---|---|---|---|---|---|---|---|---|
| $Na_2O$-percent | | LBD [5] g./ml. | Total water percent | Surf. area m²/g. | Quantometer $Na_2O$-percent | | Diff. | Sol. $Na_2O$, percent | | |
| Quant. | Soluble | | | | Before leaching | After [3] leaching | | | Hydrate | Calcined |
| .13 | .003 | 1.12 | .30 | 7.6 | .16 | .008 | .15 | .11 | 93.8 | 92.7 |
| .15 | .004 | 1.12 | .30 | 6.7 | .18 | .044 | .13 | .12 | 70.6 | 75.6 |
| .20 | .004 | 1.07 | .35 | 7.3 | .20 | .048 | .15 | .13 | 76.0 | 76.0 |
| .27 | .002 | 1.10 | .38 | 6.6 | .23 | .057 | .17 | .15 | 78.9 | 75.2 |
| .33 | .004 | 1.07 | .38 | 6.6 | .29 | .094 | .20 | .15 | 71.5 | 67.6 |
| .40 | .002 | 1.13 | .67 | 9.6 | .35 | .12 | .23 | .20 | 70.0 | 65.7 |
| .50 | .002 | 1.17 | .44 | 7.4 | .45 | .25 | .20 | .17 | 50.0 | 44.4 |
| .62 | .002 | 1.19 | .75 | 11.1 | .55 | .35 | .20 | .26 | 43.5 | 36.4 |

[1] The 100-325 mesh screened hydrate was leached 30 minutes at 88° C. using a 4:1 water:hydrate weight ratio and washed with 2 pts. hot water to remove excess soluble soda.
[2] All samples were heated in a single firing for 10 minutes at 1250-1261° C. as measured by a platinum thermocouple immersed in one of the 50 g. samples contained in pure alumina crucibles.
[3] Residue from soluble soda analysis after 20:1 $H_2O:Al_2O_3$ leach at 93° C for 30 minutes.
[4] Calculated by comparing the difference in original $Na_2O$ analyses and the calcined residual soda after leaching with the original analysis used.
[5] Loose bulk density.

perature variation between samples. A platinum-sheathed thermocouple was immersed in the center of the sample positioned in front of the furnace port. A duplicate sample placed at the back of the furnace setting confirmed that a uniform heat treatment was obtained.

The resulting alpha-aluminas were evaluated for soluble soda by using a flame photometer on the filtrate after leaching 10 g. alumina in 200 cc. of water having a pH of about 6.5 and a temperature of about 93° C for 30 minutes. The leached and unleached products were evaluated for soda content by a quantometer. The original hydrate and the unleached alumina soda analyses were both compared to the leached alumina soda values to obtain the percent soda reduction by the hot water leaching. These analytical results, along with total water and surface area values for the calcined alumina are summarized in the following table. The listed soluble soda analysis provides an alternate method of calculating the percent soda reduction by the hot water leaching.

From the preceding description and examples it is seen that only about 40 percent of the soda can be leached from an alumina starting material containing as much as 0.5 percent $Na_2O$, whereas according to the process of our invention greater than 75 percent of the soda can be removed from an alumina starting material containing less than about 0.25 percent $Na_2O$ and even greater than 90 percent from an alumina starting material containing 0.1 percent $Na_2O$.

While the invention has been described in terms of preferred embodiments, the claims appended hereto are intended to encompass all embodiments which fall within the spirit of the invention.

Having thus described our invention and certain preferred embodiments thereof we claim:

1. A process for production of low-soda alumina which comprises respectively:

1. calcining an alumina starting material selected from the group consisting of alumina and alumina hydrate of an $Na_2O$ content before subsequent leaching of less than about 0.25 percent by weight based on the $Al_2O_3$ in the absence of sufficient mineralizer to solubilize a substantial amount of soda and at a temperature of from about 1,100° C to about 1,400° C for sufficient time to solubilize sufficient soda therein to produce an alumina of less than about 0.1 percent $Na_2O$ content after subsequent leaching without substantially lowering the soda content of the alumina starting material between the beginning of said calcining and before subsequent leaching and to convert the alumina starting material to an alpha-alumina containing at least 75 percent by weight alpha-alumina and having a water content of from about 0.3 to about 1.5 percent by weight, and 2. subsequently leaching said alpha-alumina until it has an $Na_2O$ content of less than about 0.1 percent by weight based on the $Al_2O_3$, the reduction in the soda content between the alumina starting material and the leached alumina being at least about 75 percent.

2. The process of claim 1 wherein the leaching is by hot water, dilute acid or dilute alkali at a pH of from about 4 to about 9.

3. The process of claim 1 wherein the leaching is by hot water, dilute acid or dilute alkali at a pH of from about 6 to about 8.

4. The process of claim 1 wherein the soda content of the leached alumina of less than about 0.1 percent by weight amounts to less than about 0.05 percent by weight.

5. The process of claim 1 wherein the temperature at which the alumina starting material is calcined is from about 1,200° C to about 1,300° C and the time for conversion of the alumina starting material to the alpha-alumina is from about 5 to about 45 minutes.

* * * * *